(12) United States Patent
Yukawa et al.

(10) Patent No.: US 6,617,409 B2
(45) Date of Patent: Sep. 9, 2003

(54) RESIN CONTAINING PHOSPHATE GROUP

(75) Inventors: Yoshiyuki Yukawa, Hiratsuka (JP); Yutaka Masuda, Fujisawa (JP)

(73) Assignee: Kansai Paint Co., Ltd., Hyogo (JP)

( * ) Notice: Subject to any disclaimer, the term of this patent is extended or adjusted under 35 U.S.C. 154(b) by 0 days.

(21) Appl. No.: 10/312,405

(22) PCT Filed: Jul. 4, 2001

(86) PCT No.: PCT/JP01/05790

§ 371 (c)(1),
(2), (4) Date: Dec. 26, 2002

(87) PCT Pub. No.: WO02/02660

PCT Pub. Date: Jan. 10, 2002

(65) Prior Publication Data

US 2003/0114617 A1 Jun. 19, 2003

(30) Foreign Application Priority Data

Jul. 4, 2000 (JP) ........................................ 2000-202176

(51) Int. Cl.$^7$ ............................................. C08F 230/02
(52) U.S. Cl. ........................ 526/277; 526/271; 526/273; 526/274; 526/318.44; 526/320; 526/329.2
(58) Field of Search ................................. 526/271, 273, 526/274, 277, 318.44, 320, 329.2

(56) References Cited

U.S. PATENT DOCUMENTS 5,739,231 A * 4/1998 Imai et al. .................. 526/274
6,099,968 A * 8/2000 Harakawa et al. .......... 428/414

FOREIGN PATENT DOCUMENTS

| JP | 3-182569 | 8/1991 |
| JP | 5-271580 | 10/1993 |
| JP | 7-70483 | 3/1995 |
| JP | 7-138521 | 5/1995 |
| JP | 10-309455 | 11/1998 |
| JP | 2001-2736 | 1/2001 |

* cited by examiner

Primary Examiner—Helen L. Pezzuto
(74) Attorney, Agent, or Firm—Wenderoth, Lind & Ponack, L.L.P.

(57) ABSTRACT

The present invention relates to a phosphate group-containing resin obtained by copolymerizing: (a) a polymerizable monomer having a phosphate group represented by a formula [—OPO(OR)(OH)] (wherein R represents a hydrocarbon group having 4 to 10 carbon atoms), (b) a polymerizable monomer having a phosphoric acid group represented by a formula [—OPO(OH)$_2$] and (c) a (meth)acrylate base polymerizable monomer having two tertiary alkyl groups in a molecule and to a water based metallic coating material composition comprising the above phosphate group-containing resin and a metallic pigment.

15 Claims, No Drawings

RESIN CONTAINING PHOSPHATE GROUP

TECHNICAL FIELD

The present invention relates to a novel phosphate group-containing resin and a water based metallic coating material composition comprising the above phosphate group-containing resin.

BACKGROUND ART

A water based metallic coating material containing a metallic pigment such as aluminum flake has the problem that the metallic pigment is brought into contact with a large amount of water contained in the coating material and corroded to generate hydrogen gas. In order to solve this problem, it is proposed that phosphoric acid esters are added to a water based metallic coating material to protect the surface of a metallic pigment with the phosphoric acid esters making use of an adsorptive action exerted by an acidic hydroxyl group bonded to a phosphorus atom of the above esters to inhibit reaction caused by direct contact of water with the metallic pigment. However, it is difficult to inhibit this reaction over a long period of time in a water based metallic coating material comprising such phosphoric acid esters, and a metallic coating film formed has the defect that an adhesive property, a water resistance, a chipping resistance and a metallic finish feeling are not satisfactory.

Disclosed respectively are a water based metallic coating material comprising an aluminum flake treated with a phosphoric acid ester in Japanese Patent Application Laid-Open No. 168670/1983, a water based metallic coating material comprising a phosphoric acid ester of caprolactone in Japanese Patent Application Laid-Open No. 29607/1986, a water based metallic coating material comprising a reaction product of orthophosphoric acid and an epoxy compound in Japanese Patent Application Laid-Open No. 47771/1986, a water based metallic coating material comprising a phosphate-containing acryl polymer obtained from orthophosphoric acid and a glycidy group-containing acryl polymer in Japanese Patent Application Laid-Open No. 190765/1989 and a water based metallic coating material comprising a polymer of styrene and allyl alcohol and a reaction product of p-t-amylphenol and orthophosphoric acid or phosphorus pentaoxide in Japanese Patent Publication No. 46624/1990. However, all of these water based metallic coating materials have the defect that the coating films thereof are not satisfactory in an adhesive property, a water resistance and a metallic appearance.

DISCLOSURE OF THE INVENTION

It has been found that a phosphate group-containing resin which is a copolymer of two kinds of some specific phosphate group-containing polymerizable monomers and a polymerizable monomer having two tertiary alkyl groups in a molecule is excellent in an adsorptive property to the surface of a metallic pigment and effective for inhibiting a reaction of water with a metallic pigment over a long period of time and that a coating film formed from a water based metallic coating material comprising such phosphate group-containing resin is excellent in performances such as an adhesive property, a water resistance, a chipping resistance and a metallic finish feeling.

Thus, according to the present invention, provided is a phosphate group-containing resin obtained by copolymerizing:

(a) a polymerizable monomer having a phosphate group represented by a formula [—OPO(OR)(OH)] (wherein R represents a hydrocarbon group having 4 to 10 carbon atoms), (b) a polymerizable monomer having a phosphoric acid group represented by a formula [—OPO(OH)$_2$] and (c) a (meth)acrylate base polymerizable monomer having two tertiary alkyl groups in a molecule, which is represented by:

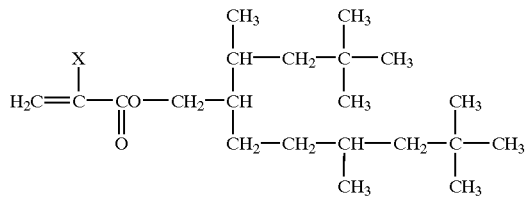

wherein X represents hydrogen or methyl.

Further, according to the present invention, provided is a water based metallic coating material composition comprising the phosphate group-containing resin described above and a metallic pigment.

The phosphate group-containing resin and the water based metallic coating material composition which are provided by the present invention shall be explained below in further details.

EMBODIMENT OF THE INVENTION

Polymerizable Monomer (a) Having a Phosphoric Acid Monoester Group

The polymerizable monomer (a) is a phosphoric acid diester compound having each at least one phosphate group represented by a formula [—OPO(OR)(OH)] and polymerizable double bond in a molecule, wherein R represents a hydrocarbon group having 4 to 10 carbon atoms, and to be specific, it includes, for example, linear or branched chain alkyl groups such as butyl, isobutyl, sec-butyl, tert-butyl, pentyl, isopentyl, hexyl, octyl, 2-ethylhexyl, decyl and isodecyl.

Included in the polymerizable monomer (a) are those obtained by reacting, for example, one acidic hydroxyl group contained in a phosphoric acid monoester represented by (HO)$_2$PO(OR), for example, phosphate such as monobutyl phosphate (R=C$_4$H$_9$) and monoisodecyl phosphate (R=C$_{10}$H$_{21}$) with a glycidyl group-containing compound having a polymerizable double bond, for example, glycidyl acrylate and glycidyl methacrylate.

Polymerizable Monomer (b) Having a Phosphoric Acid Group

The polymerizable monomer (b) is a compound having each at least one a phosphoric acid group represented by a formula [—OPO(OH)$_2$] and polymerizable double bond in a molecule, and to be specific, it includes, for example, (2-acryloyloxyethyl) acid phosphate, (2-methacryloyloxyethyl) acid phosphate, (2-acryloyloxypropyl) acid phosphate and (2-methacryloyloxypropyl) acid phosphate.

(Meth)acrylate Base Polymerizable Monomer (c)

The polymerizable monomer (c) is a compound represented by:

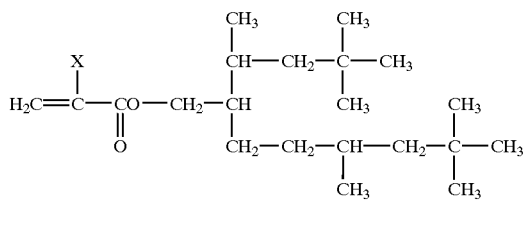

(wherein X represents hydrogen or methyl) in a molecule, and it has two tertiary alkyl groups in a molecule, in which three methyl groups are bonded to one carbon atom. Use of this monomer (c) makes it easy to allow metallic flakes to be aligned parallel to the coated face in the water based metallic coating material of the present invention and makes it possible to elevate the metallic appearance of the coating film.

Other Polymerizable Monomer (d)

The phosphate group-containing resin of the present invention is obtained by copolymerizing as essential components, the polymerizable monomer (a), the polymerizable monomer (b) and the polymerizable monomer (c) each described above, and if necessary, the other polymerizable monomer (d) in addition thereto can be used in combination as a copolymerization component.

The other polymerizable monomer (d) is a compound having at least one polymerizable double bond in a molecule other than the polymerizable monomers (a), (b) and (c) each described above, and it includes compounds exemplified below.
1) (Meth)acrylate base monomers: for example, $C_1$ to $C_{24}$ alkyl esters of (meth)acrylic acid such as methyl methacrylate, ethyl (meth)acrylate, propyl (meth)acrylate, butyl (meth)acrylate, 2-ethylhexyl (meth)acrylate and lauryl (meth)acrylate.
2) Hydroxyl group-containing monomers: for example, $C_2$ to $C_{10}$ hydroxyalkyl esters of (meth)acrylic acid, such as hydroxyethyl (meth)acrylate and hydroxypropyl (meth)acrylate.
3) Carboxyl group-containing monomers: for example, unsaturated carboxylic acids and anhydrides thereof such as (meth)acrylic acid, maleic acid and maleic anhydride.
4) Other monomers: for example, vinyl aromatic compounds such as styrene, α-methylstyrene and vinyltoluene, (meth) acrylonitrile and vinyl acetate.

The phosphate group-containing resin of the present invention can be produced by copolymerizing the polymerizable monomers (a) to (d) each described above in the presence of a polymerization initiator by a conventionally known method, for example, a solution polymerization method. A use proportion of these polymerizable monomers in copolymerization shall not strictly be restricted and can be changed over a wide range depending on characteristics desired to the phosphate group-containing resin produced. In general, it can fall in the following range based on the total amount of the polymerizable monomers (a) to (d):

| | |
|---|---|
| polymerizable monomer (a): | 0.5 to 30% by weight, preferably 1 to 20% by weight and particularly preferably 1.5 to 15% by weight, |
| polymerizable monomer (b): | 1 to 35% by weight, preferably 3 to 20% by weight and particularly preferably 5 to 18% by weight, |
| polymerizable monomer (c): | 3 to 35% by weight, preferably 5 to 30% by weight and particularly preferably 8 to 25% by weight, and |
| polymerizable monomer (d): | 0 to 95.5% by weight, preferably 30 to 91% by weight and particularly preferably 42 to 85.5% by weight. |

The phosphate group-containing resin of the present invention can have a weight average molecular weight falling in a range of usually 3,000 to 100,000, preferably 5,000 to 50,000 and particularly preferably 5,000 to 30,000 and an acid value falling in a range of 20 to 140 mgKOH/g, particularly 40 to 120 mgKOH/g and further particularly 50 to 100 mgKOH/g originating in a phosphoric acid group. Further, the phosphate group-containing resin of the present invention can contain, if necessary, a carboxyl group and/or a hydroxyl group, and a content of these groups falls preferably in a range of 100 mgKOH/g or less, particularly 0 to 80 mgKOH/g in terms of an acid value originating in a carboxyl group and 0 to 120 mgKOH/g, particularly 15 to 100 mgKOH/g in terms of a hydroxyl value.

Water Based Metallic Coating Material Composition

The phosphate group-containing resin provided by the present invention is very useful as a passivator for the metallic pigment in the water based metallic coating material and not only protects the metallic pigment from corrosion caused by reaction with water over a long period of time but also is excellent in an aligning property of the metallic pigment, and blending of the phosphate group-containing resin makes it possible to provide the water based metallic coating material composition which is excellent in a storage stability and excellent as well in coating film performances such as an adhesive property, a water resistance, a chipping resistance and a metallic finish feeling.

Thus, according to the present invention, provided is the water based metallic coating material composition comprising the phosphate group-containing resin of the present invention and the metallic pigment.

The water based metallic coating material composition of the present invention can be prepared by mixing and dispersing a base resin, a curing agent, the phosphate group-containing resin of the present invention and the metallic pigment and, if necessary, the other coating material additives in a water based medium.

Conventionally known resins which have so far been used for water based coating materials can be used as the base resin and includes, for example, water-soluble or water-dispersible reins such as alkyd resins, acryl resins, polyester resins and urethane resins. These resins have preferably cross-linking functional groups such as a hydroxyl group, a carboxyl group and an epoxy group in the molecules thereof The curing agent includes melamine resins, blocked polyisocyanate compounds, epoxy compounds and carboxyl group-containing compounds which can be reacted with these functional groups. A blending proportion of the base resin and the curing agent falls suitably in a range of 50 to 90%, particularly 60 to 80% in the former case and 50 to 10%, particularly 40 to 20% in the latter case each based on the total solid matter weight of the both.

The metallic pigment is a pigment which provides the coating film with a sparkling brilliant feeling and a light coherent pattern, and to be specific, capable of being used is at least one pigment selected from non-leafing type or leafing type aluminum (including deposited aluminum), aluminum oxide, copper, zinc, brass, nickel, mica and micas coated with titanium oxide and iron oxide. These metallic pigments are preferably flake-shaped. A blending proportion of the metallic pigment falls suitably in a range of usually 1 to 50 parts by weight, particularly 5 to 30 parts by weight per 100 parts by weight of the total of the base resin and the curing agent.

A blending proportion of the phosphate group-containing resin of the present invention falls suitably in a range of usually 0.1 to 15 parts by weight, particularly 0.5 to 10 parts by weight in terms of a solid matter per 100 parts by weight of the metallic pigment.

The phosphate group-containing resin of the present invention can be neutralized in advance with a base such as, for example, ammonia, dimethylamine, triethylamine, ethanolamine and dimethylethanolamine prior to blending with the coating material.

The water based metallic coating material composition of the present invention can be prepared, for example, by mixing and dispersing the base resin, the curing agent, the phosphate group-containing resin of the present invention and the metallic pigment each described above, if necessary, together with coating material additives such as a solid color pigment, an extender pigment, a hydrophilic organic solvent, a surface controlling agent and a settling inhibitor in a water based medium by a conventionally known method. In this case, the phosphate group-containing resin of the present invention and the metallic pigment are preferably mixed in advance, and the mixture thereof is preferably mixed and dispersed in a water based medium together with the base resin and the curing agent. To be more specific, the metallic pigment is homogeneously mixed with the phosphate group-containing resin solution of the present invention in which a solid matter content is controlled to 40 to 70% by weight in the proportion described above to adsorb the phosphate group-containing resin on the surface of the metallic pigment, and it is then neutralized with the base described above and dispersed. Then, it is preferably mixed and dispersed in water together with the base resin and the curing agent.

The coating material composition of the present invention can be coated directly on an article to be coated such as a metal-made or plastic-made automobile outside plate. In general, an undercoating material such as an electrodepositable coating material and, if necessary, an intermediate coating material are coated thereon in advance, and these coating films are cured. Then, the coating material composition of the present invention is preferably coated on the coated face thereof. A viscosity of the coating material composition of the present invention is controlled to a range of 10 to 30 seconds/Ford cup #4/20° C. and preferably coated d by a method such as airless spray, air spray and an electrostatic method so that a film thickness is 10 to 40 μm in terms of a cured film thickness.

The metallic coating film thus formed can usually be cured by heating at a temperature of about 100 to about 170° C. for 10 to 40 minutes. Further, after curing this metallic coating film or without curing it, a clear coating material can further be coated on this metallic coated face.

EXAMPLES

The present invention shall more specifically be explained below with reference to examples related to the present invention and comparative examples. Both of parts and percentage are based on weight, and a thickness of the coating film is that of the cured coating film.

Example 1

A reactor equipped with a stirrer, a temperature-controller and a condenser was charged with a mixed solvent of 27.5 parts of methoxypropanol and 27.5 parts of isobutanol and heated to 110° C. It was maintained at the same temperature, and then dropwise added to the mixed solvent described above in 4 hours was 121.5 parts of a mixture comprising 25 parts of styrene, 27.5 parts of n-butyl methacrylate, 20 parts of "Isostearyl Acrylate" (trade name, corresponding to the polymerizable monomer (c), manufactured by Osaka Organic Chemical Co., Ltd.), 7.5 parts of 4-hydroxybutyl acrylate, 15 parts of a phosphate group-containing polymerizable monomer (a1) (remark 1), 12.5 parts of 2-methacryloyloxyethyl acid phosphate (corresponding to the polymerizable monomer (b)), 10 parts of isobutanol and 4 parts of t-butylperoxyoctanoate. Further, a mixture comprising 0.5 part of t-butylperoxyoctanoate and 20 parts of isopropanol was dropwise added thereto in one hour. Then, the mixture was stirred and ripened for one hour to obtain a phosphate group-containing resin solution (I). The above resin had an acid value of 83 mgKOH/g originating in a phosphate group, a hydroxyl group value of 29.2 mgKOH/g originating in 4-hydroxybutyl acrylate, a weight average molecular weight of 10000 and a solid matter content of 50%.

(Remark 1) Phosphate group-containing polymerizable monomer (a1): A reactor equipped with a stirrer, a temperature-controller and a condenser was charged with 57.55 parts of monobutyl phosphate and 41.1 parts of isobutanol, and,42.45 parts of glycidyl methacrylate was dropwise added thereto in 2 hours under air flow, followed by further stirring and ripening for one hour. Then, 58.88 parts of isopropanol was added to dilute the solution to obtain a phosphate group-containing polymerizable monomer. It had an acid value of 285 mgKOH/g originating in a phosphoric acid group and a solid matter content of 50%.

Example 2

A reactor equipped with a stirrer, a temperature-controller and a condenser was charged with a mixed solvent of 27.5 parts of methoxypropanol and 27.5 parts of isobutanol and heated to 110° C. It was maintained at the same temperature, and then dropwise added to the mixed solvent described above in 4 hours was 121.5 parts of a mixture comprising 50 parts of styrene, 7.5 parts of n-butyl methacrylate, 15 parts of "Isostearyl Acrylate" (trade name, corresponding to the polymerizable monomer (c), manufactured by Osaka Organic Chemical Co., Ltd.), 7.5 parts of 4-hydroxybutyl acrylate, 15 parts of the phosphate group-containing polymerizable monomer (a1) (remark 1), 12.5 parts of 2-methacryloyloxyethyl acid phosphate (corresponding to the polymerizable monomer (b)), 10 parts of isobutanol and 4 parts of t-butylperoxyoctanoate. Further, a mixture comprising 0.5 part of t-butylperoxyoctanoate and 20 parts of isopropanol was dropwise added thereto in one hour. Then, the mixture was stirred and ripened for one hour to obtain a phosphate group-containing resin solution (II). The above resin had an acid value of 83 mgKOH/g originating in a phosphoric acid group, a hydroxyl group value of 29.2 mgKOH/g originating in 4-hydroxybutyl acrylate, a weight average molecular weight of 10000 and a solid matter content of 50%.

Example 3

Mixed were 18.06 parts of "Alpaste 891K" (trade name, manufactured by Toyo Aluminum Co., Ltd., flaky aluminum metallic pigment paste, aluminum pigment content: 72%), 12.5 parts of butyl cellosolve, 6.25 parts of hexyl cellosolve and 6.25 parts of "Shellsol 71L" (trade name, manufactured by Showa Shell Co., Ltd., hydrocarbon base organic solvent), and the mixture was stirred until the aluminum pigment was homogeneously dispersed. Then, 3.92 parts of the resin solution (I) obtained in Example 1 and 0.2 part of methylethanolamine were added to this mixture to neutralize it, and the mixture was stirred for one hour. Next, 40 parts of an acryl emulsion (remark 2) was added to this mixture while stirring, and 62.72 parts of deionized water was then added to dilute the mixture, followed by stirring for one hour to obtain a mill base.

Added to 160 parts of the acryl emulsion (remark 2) were 33.33 parts of "90% Cymel 327" (trade name, manufactured by Mitsui Cytec Co., Ltd., melamine resin) and 57.14 parts of a 35% polyester aqueous solution (remark 3), and the mixture was stirred for 15 minutes. Then, 150 parts of the mill base described above was added thereto and stirred for 30 minutes, and deionized water and methylethanolamine were then added to obtain a water based metallic coating material having a pH of 8.4 to 8.5 and a solid matter content of 25%.

(Remark 2) Acryl emulsion: A reactor equipped with a stirrer, a temperature-controller and a condenser was charged with 32.1 parts of deionized water and 0.267 part of "N-562SF" (emulsifier, manufactured by Nippon Nyukazai Co., Ltd.) and heated to 80° C., and then 0.033 part of ammonium persulfate dissolved in 1.110 part of deionized water was added thereto to ripen the mixture for 20 minutes. Then, mixed were 14.45 parts of methyl methacrylate, 7.12 parts of n-butyl methacrylate, 0.67 part of allyl methacrylate, 21.63 parts of deionized water and 0.267 part of "N-562SF" to prepare a pre-emulsion, and the resulting pre-emulsion was dropwise added to the reactor in 2 hours, followed by ripening it for one hour. Then, mixed were 2.29 parts of methyl methacrylate, 2.48 parts of n-butyl methacrylate, 0.98 part of 2-hydroxyethyl acrylate, 0.78 part of methacrylic acid, 9.77 parts of deionized water and 0.114 part of "N-562SF" to prepare a pre-emulsion, and the resulting pre-emulsion was dropwise added to the reactor in 2 hours. A solution prepared by dissolving 0.003 part of ammonium persulfate in 1.110 part of deionized water was dropwise added together with this emulsion in 2 hours. Then, the emulsion was ripened for one hour, and A solution prepared by dissolving 0.294 part of dimethylethanolamine in 19.53 parts of deionized water was added thereto. The emulsion thus obtained had a solid matter content of 25%, a pH of 8.5 and a particle diameter of 120 nm.

(Remark 3) 35% Polyester aqueous solution: A reactor equipped with a stirrer, a partial condenser, a whole condenser and a torque meter was charged with 78.75 parts (0.75 mole) of neopentyl glycol, 34.13 parts (0.25 mole) of trimethylolpropane, 65.7 parts (0.45 mole) of adipic acid and 74.7 parts (0.45 mole) of isophthalic acid and heated from 150 to 230° C. in 3 hours, and it was maintained at the same temperature for 1.5 hour to carry out condensation reaction while allowing condensed water to flow out to the outside of the system. Then, 3 parts of toluene was added thereto to continue stirring and dehydration while refluxing to carry out reaction until an acid value originating in a carboxyl group became 8 mgKOH/g, and resulting water was removed by subjecting it to azeotropy with toluene. Then, the temperature was lowered to 170° C., and 6.72 parts (0.035 mole) of trimellitic anhydride was added thereto. The solution was ripened at the same temperature for 30 minutes, and then 20 parts of butylcarbitol was added thereto, followed by reducing the temperature to 80° C.

A water-soluble polyester resin thus obtained had an acid value of 25 mgKOH/g, a hydroxyl group value of 93 mgKOH/g and a number average molecular weight of 1700. Added thereto was 9 parts of dimethylethanolamine to neutralize the solution, and the solid matter content was adjusted to 35% by deionized water.

Example 4

Mixed were 18.06 parts of "Alpaste 891K", 12.5 parts of butyl cellosolve, 6.25 parts of hexyl cellosolve and 6.25 parts of "Shellsol 71L", and the mixture was stirred until the aluminum pigment was homogeneously dispersed. Then, 3.92 parts of the resin solution (II) obtained in Example 2 and 0.2 part of methylethanolamine were added to this mixture to neutralize it, and the mixture was stirred for one hour. Next, 40 parts of the acryl emulsion (remark 2) was added to this mixture while stirring, and 62.72 parts of deionized water was then added to dilute the mixture, followed by stirring for one hour to obtain a mill base.

Added to 160 parts of the acryl emulsion (remark 2) were 33.33 parts of "90% Cymel 327" and 57.14 parts of the 35% polyester aqueous solution (remark 3), and the mixture was stirred for 15 minutes. Then, 150 parts of the mill base described above was added thereto and stirred for 30 minutes, and deionized water and methylethanolamine were then added to obtain a water based metallic coating material having a pH of 8.4 to 8.5 and a solid matter content of 25%.

Comparative Example 1

Mixed were 18.06 parts of "Alpaste 891K", 12.5 parts of butyl cellosolve, 6.25 parts of hexyl cellosolve and 6.25 parts of "Shellsol 71L", and the mixture was stirred until the aluminum pigment was homogeneously dispersed. Next, 40 parts of the acryl emulsion (remark 2) was added to this mixture while stirring, and 62.72 parts of deionized water was then added to dilute the mixture, followed by stirring for one hour to obtain a mill base.

Added to 160 parts of the acryl emulsion (remark 2). were 33.33 parts of "90% Cymel 327" and 57.14 parts of the 35% polyester aqueous solution (remark 3), and the mixture was stirred for 15 minutes. Then, 150 parts of the mill base described above was added thereto and stirred for 30 minutes, and deionized water and methylethanolamine were then added to obtain a water based metallic coating material having a pH of 8.4 to 8.5 and a solid matter content of 25%.

Comparative Example 2

According to descriptions of Japanese Patent Application Laid-Open No. 190765/1989, a reactor of one liter equipped with a stirrer, a thermometer and a condenser was charged with 183 parts of ethylene glycol monobutyl ether and heated to 130° C., and dropwise added thereto at the same temperature in 3 hours were a monomer solution comprising 69.6 parts of glycidyl methacrylate, 144.01 parts of hydroxyethyl methacrylate, 98.4 parts of methyl methacrylate and 120 parts of lauryl methacrylate and 96 parts of a xylene solution containing 24 parts of azobisisobutyronitrile to react them. After 30 minutes passed since finishing dropwise adding, 32 parts of a xylene solution containing 3 parts of azobisisobutyronitrile was further dropwise added in 15 minutes. Then, stirring was continued at 130° C. for 2 hours to react them. The resulting mixed solution was cooled down to 50° C., and 56.5 parts of phosphoric acid (85% aqueous solution) was added thereto, and the solution was maintained at 50° C. for 2 hours to finish the reaction. It had a solid matter content of 54.5%, an acid value of 71 mgKOH/g and a number averaged molecular weight of 3000.

Then, a water based metallic coating material was obtained in the same manner as in Example 3, except that 3.6 parts of the reaction product (solid matter content: 54.5%) described above was substituted for 3.92 parts of the resin solution (I) obtained in Example 3. It had a pH of 8.4 to 8.5 and a solid matter content of 25%.

Comparative Example 3

According to descriptions of Japanese Patent Publication No. 46624/1990, a mixture of a styrene/allyl alcohol (1.57:1 weight ratio) copolymer having a molecular weight of 1150 (104.7 parts, 1.0 mole), p-tert-amylphenol (44.5 parts, 3 mole) and xylene (168.6 parts) was heated and stirred at 85 to 90° C. in a reactor equipped with a stirrer, a thermometer, a reflux condenser and a Dean and Stark separator until the solid component was dissolved. Then, phosphorus pentaoxide (19.4 parts, 1.5 mole) and an additional part (20 parts) of xylene were added thereto, and the temperature was elevated to a reflux temperature (140 to 143° C.) of the diluent (xylene). After 3 hours, 1.2 part of water was removed. Then, the reaction mixture was distilled under vacuum for 30 minutes to remove xylene (132 parts). This xylene was substituted with isobutanol (90.8 parts) added in 10 minutes. A corrosion inhibitor solution thus obtained had a solid matter content of 53.6% and an acid value of 114 mgKOH/g.

Then, a water based metallic coating material was prepared in the same manner as in Example 1, except that 3.65 parts of the corrosion inhibitor solution described above was added in place of the phosphate group-containing resin obtained in Example 1 and that the solution was neutralized with 0.28 part of methylethanolamine.

Comparative Example 4

Mixed were 18.06 parts of "Alpaste 891K", 12.5 parts of butyl cellosolve, 6.25 parts of hexyl cellosolve and 6.25 parts of "Shellsol 71L", and the mixture was stirred until the aluminum pigment was homogeneously dispersed. Then, 3.92 parts of the following resin solution (III) (remark 4) and 0.2 part of methylethanolamine were added to this mixture to neutralize it and stirred for one hour. Next, 40 parts of the acryl emulsion (remark 2) was added to this mixture while stirring, and 62.72 parts of deionized water was then added to dilute the mixture, followed by stirring for one hour to obtain a mill base.

Added to 160 parts of the acryl emulsion (remark 2) were 33.33 parts of "90% Cymel 327" and 57.14 parts of the 35% polyester aqueous solution (remark 3), and the mixture was stirred for 15 minutes. Then, 150 parts of the mill base described above was added thereto and stirred for 30 minutes, and deionized water and methylethanolamine were then added to obtain a water based metallic coating material having a pH of 8.4 to 8.5 and a solid matter, content of 25%. (Remark 4) Resin solution (III): A reactor equipped with a stirrer, a temperature-controller and a condenser was charged with a mixed solvent of 27.5 parts of methoxypropanol and 27.5 parts of isobutanol, and it was heated to 110° C. and maintained at the same temperature. Then, dropwise added to the mixed solvent described above in 4 hours was 121.5 parts of a mixture comprising 25 parts of styrene, 47.5 parts of n-butyl methacrylate, 7.5 parts of 4-hydroxybutyl acrylate, 15 parts of the phosphate group-containing polymerizable monomer (a1) (remark 1), 12.5 parts of 2-methacryloyloxyethyl acid phosphate (corresponding to the polymerizable monomer (b)), 10 parts of isobutanol and 4 parts of t-butylperoxyoctanoate. Further, a mixture comprising 0.5 part of t-butylperoxyoctanoate and 20 parts of isopropanol was dropwise added thereto in one hour. Then, the mixture was stirred and ripened for one hour to obtain a phosphate group-containing resin solution (III). This resin had an acid value of 83 mgKOH/g originating in a phosphoric acid group, a hydroxyl group value of 29.2 mgKOH/g originating in 4-hydroxybutyl acrylate, a weight average molecular weight of 10,000 and a solid matter content of 50%.

Coating Material Performance Test

Measurement of gas generating amount: put in the bottom of an Erlenmeyer flask having a capacity of 300 ml was 150 g of the water based metallic coating materials obtained in Examples 3 and 4 and Comparative Examples 1, 2, 3 and 4 (all of them had a solid matter content of 25% and a content of a flaky aluminum metallic pigment of 8%), and a measuring pipette was inserted into the central part of this vessel in an almost vertical direction. The lower end part thereof was immersed in the water based metallic coating material, and a space of about 5 mm was provided between the lower end part thereof and the flask bottom. The outside of the measuring pipette and the inside of the cap part of the Erlenmeyer flask were tightly sealed with a cork stopper to shut it off from the outside with the inside of the measuring pipette communicating with the outside. It was stored at 40° C. for 10 days to measure a height of the water based metallic coating material in the inside of the pipette which was pushed up by pressure of gas generated during storage. The results thereof are shown in Table 1.

Coating Film Performance Test

The water based metallic coating materials obtained in Examples 3 and 4 and Comparative Examples 1, 2, 3 and 4 were coated on a steel plate on which a cationically electrodepositable coating material and an intermediate coating material were coated and cured by heating so that the film thickness was 15 μm, and the steel plate was left standing at a room temperature for 2 minutes. Then, "Magicron KINO1001" (trade name, carboxyl group-containing acryl resin epoxy group-containing compound-containing organic solvent base acid epoxy type clear coating material, manufactured by Kansai Paint Co., Ltd.). was coated thereon so that the film thickness was 30 μm, and it was heated at 140° C. for 30, minutes to cure both coating films at the same time. The double coating film thus obtained was tested for a layer-to-layer adhesive property, a water resistance, a chipping resistance, a metallic appearance and a flip-flop property. The results thereof are shown in Table 1.

The tests were carried out by the following methods.

Layer-to-layer Adhesive Property

The double coating film on the coated steel plate was cut by a cutter so that it reached the base to make 100 cross-cuts having a size of 1 mm×1 mm, and an adhesive cellophane tape was adhered on the surface thereof to investigate the number of the cross-cut coating film remaining thereon after quickly peeling the tape at 20° C.

◯: 100 crosscuts remain

Δ: 99 to 90 cross-cuts remain

X: 89 or less cross-cuts remain

Water Resistance

The coated steel plate was dipped in warm water of 40° C. for 240 hours and pulled up, and it was dried at a room temperature for 12 hours. Then, it was tested in the same manner as that in the layer-to-layer adhesive property test described above. It was evaluated according to the same criteria.

Chipping Resistance

About 500 ml of crushed stones having a diameter of about 15 to 20 mm was blown onto the double coated face at 20° C. at an air pressure of 4 kg/cm², and then the coated face was observed.

○: a little impact peeling is observed on a part of the clear coating film

Δ: a little large impact peeling is observed on the clear coating film and the metallic coating film X: very large impact peeling is observed on the clear coating film and the metallic coating film, and a large part of the intermediate coated film is peeled off

Metallic Appearance

It is visually observed.

○: metallic pigment is aligned parallel to coated face and evenly, and metallic unevenness is not observed at all Δ: a little metallic unevenness is observed X: large metallic unevenness is observed

Flip-flop Property

Measured by means of a bending spectrophotometer "MA68" manufactured by X-RITE Co., Ltd. AY value a at 15° and a Y value b at 45° are determined, and they are applied to the following equation to calculate the flip-flop property (FF):

$$FF=(a-b)/[(a+b)/2]$$

TABLE 1

| | Example | | Comparative Example | | | |
|---|---|---|---|---|---|---|
| | 3 | 4 | 1 | 2 | 3 | 4 |
| Gas generating amount | 0.1 | 0 | 20< | 18.8 | 6.2 | 7 |
| Layer-to-layer adhesive property | ○ | ○ | x | x | ○ | ○ |
| Water resistance | ○ | ○ | x | x | ○ | ○ |
| Chipping resistance | ○ | ○ | x | Δ | Δ | Δ |
| Metallic appearance | ○ | ○ | x | x | Δ | Δ |
| Flip-flop property | 1.72 | 1.8 | 1.3 | 1.35 | 1.5 | 1.53 |

What is claimed is:

1. A phosphate group-containing resin obtained by copolymerizing:

(a) a polymerizable monomer having a phosphate group represented by a formula [—OPO(OR)(OH)] (wherein R represents a hydrocarbon group having 4 to 10 carbon atoms), (b) a polymerizable monomer having a phosphoric acid group represented by a formula [—OPO(OH)₂] and (c) a (meth)acrylate base polymerizable monomer having two tertiary alkyl groups in a molecule, which is represented by:

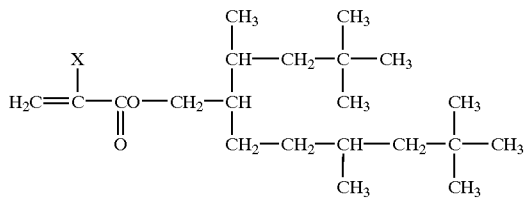

wherein X represents hydrogen or methyl.

2. The phosphate group-containing resin as described in claim 1, wherein the polymerizable monomer (a) is a compound having each at least one phosphate group represented by a formula [—OPO(OR)(OH)] and polymerizable double bond in a molecule.

3. The phosphate group-containing resin as described in claim 1, wherein the polymerizable monomer (a) is obtained by reacting one acidic hydroxyl group contained in a phosphoric acid monoester represented by (HO)₂PO(OR) with a glycidyl group-containing compound having a polymerizable double bond.

4. The phosphate group-containing resin as described in claim 1, wherein the polymerizable monomer (b) is a compound having each at least one phosphoric acid group represented by a formula [—OPO(OH)₂] and polymerizable double bond in a molecule.

5. The phosphate group-containing resin as described in claim 1, wherein the polymerizable monomer (b) is selected from the group consisting of (2-acryloyloxyethyl) acid phosphate, (2-methacryloyloxyethyl) acid phosphate, (2-acryloyloxyproyl) acid phosphate and (2-methacryloyloxyproyl) acid phosphate.

6. The phosphate group-containing resin as described in claim 1, obtained by further copolymerizing the other polymerizable monomer (d).

7. The phosphate group-containing resin as described in claim 6, wherein the polymerizable monomer (d) is selected from the group consisting of methyl methacrylate, ethyl (meth)acrylate, propyl (meth)acrylate, butyl (meth)acrylate, 2-ethylhexyl (meth)acrylate, lauryl (meth)acrylate, hydroxyethyl (meth)acrylate, hydroxypropyl (meth)acrylate, glycidyl (meth)acrylate, (meth)acrylic acid, maleic acid, maleic anhydride, styrene, α-methylstyrene, vinyltoluene, (meth)acrylonitrile and vinyl acetate.

8. The phosphate group-containing resin as described in claim 1, obtained by copolymerizing 0.5 to 30% by weight of the polymerizable monomer (a), 1 to 35% by weight of the polymerizable monomer (b), 3 to 35% by weight of the polymerizable monomer (c) and 0 to 95.5% by weight of the polymerizable monomer (d) based on the total amount of the polymerizable monomers (a) to (d).

9. The phosphate group-containing resin as described in claim 1, obtained by copolymerizing 1 to 20% by weight of the polymerizable monomer (a), 3 to 20% by weight of the polymerizable monomer (b), 5 to 30% by weight of the polymerizable monomer (c) and 30 to 91% by weight of the polymerizable monomer (d) based on the total amount of the polymerizable monomers (a) to (d).

10. The phosphate group-containing resin as described in claim 1, having a weight average molecular weight falling in a range of 3,000 to 100,000 and an acidic value falling in a range of 20 to 140 mgKOH/g originating in a phosphoric acid group.

11. The phosphate group-containing resin as described in claim 1, having a weight average molecular weight falling in a range of 5,000 to 50,000 and an acidic value falling in a range of 40 to 120 mgKOH/g originating in a phosphoric acid group.

12. The phosphate group-containing resin as described in claim 1, having an acidic value falling in a range of 100 mgKOH/g or less originating in a carboxyl group and a hydroxyl group value falling in a range of 0 to. 120 mgKOH/g or less.

13. A water based metallic coating material composition comprising the phosphate group-containing resin as described in claim 1 and a metallic pigment.

14. The water based metallic coating material composition as described in claim 13, comprising the phosphate group-containing resin in an amount falling in a range of 0.1 to 15 parts by weight in terms of a solid matter per 100 parts by weight of the metallic pigment.

15. An article coated with the water based metallic coating material composition as described in claim 13.

* * * * *